(12) United States Patent
Rutkowski

(10) Patent No.: US 6,999,841 B1
(45) Date of Patent: Feb. 14, 2006

(54) CONTROL SYSTEM OF A NUMERICAL TOOL MACHINE WITH A REUSABLE SOFTWARE STRUCTURE

(75) Inventor: Christian Rutkowski, Traunstein (DE)

(73) Assignee: Dr. Johannes Heidenhain GmbH, Traunreut (DE)

(*) Notice: Subject to any disclaimer, the term of this patent is extended or adjusted under 35 U.S.C. 154(b) by 216 days.

(21) Appl. No.: 10/110,587

(22) PCT Filed: Oct. 12, 2000

(86) PCT No.: PCT/EP00/10042

§ 371 (c)(1),
(2), (4) Date: Mar. 6, 2003

(87) PCT Pub. No.: WO01/27703

PCT Pub. Date: Apr. 19, 2001

(30) Foreign Application Priority Data

Oct. 14, 1999 (DE) ................................ 199 49 558

(51) Int. Cl.
*G06F 19/00* (2006.01)
(52) U.S. Cl. .................. 700/181; 700/182; 700/162
(58) Field of Classification Search ................ 700/162, 700/179–182; 219/69.17; 483/8–9
See application file for complete search history.

(56) References Cited

U.S. PATENT DOCUMENTS

| 5,212,645 A | 5/1993 | Wildes et al. |
| 5,378,218 A * | 1/1995 | Daimaru et al. ................ 483/9 |
| 5,453,933 A | 9/1995 | Wright et al. |
| 5,506,787 A | 4/1996 | Mühlfeld et al. |
| 5,844,804 A | 12/1998 | Schussler |
| 5,914,883 A | 6/1999 | Riva et al. |
| 5,940,301 A * | 8/1999 | Damman et al. ............ 700/159 |
| 5,943,497 A | 8/1999 | Bohrer et al. |
| 6,556,886 B1 * | 4/2003 | Riva et al. ................... 700/162 |

FOREIGN PATENT DOCUMENTS

DE 43 30 218 A1 3/1995

(Continued)

OTHER PUBLICATIONS

W. Eversheim et al., "Objektorientiert programmieren—Wiederverwendung und Anderungsprogrammierung von NC-Programmen," Industrie-Anzeiger, vol. 82, 1991, pp. 38, 41 and 42.

(Continued)

*Primary Examiner*—Leo Picard
*Assistant Examiner*—Douglas S. Lee
(74) *Attorney, Agent, or Firm*—Brinks Hofer Gilson & Lione

(57) ABSTRACT

A control system of a numerically controlled machine tool with a software structure, the control system including a program code of a control program specific to a machine tool and a framework that is independent of an application, wherein the framework is implemented in the form of a class library that has a first set of classes that define a functional structure of the control system. A second set of classes derived from the first set of classes of the framework, wherein the second set of classes contain the program code that is specific to the machine tool and that implements application specific functions of at least one of several functional groups associated with a man-machine interface, geometry processing, an interpolator, movement processing and a programmable logic controller.

6 Claims, 1 Drawing Sheet

FOREIGN PATENT DOCUMENTS

| | | |
|---|---|---|
| DE | 196 14 202 A1 | 11/1997 |
| DE | 694 06 672 T2 | 6/1998 |
| DE | 197 51 955 A1 | 6/1999 |
| EP | 0 524 344 B1 | 5/1996 |
| EP | 0 657 043 B1 | 3/1997 |
| EP | 0 717 866 B1 | 11/1997 |

OTHER PUBLICATIONS

A. Storr et al., "Einsatz objektorientierter Strukturen zur Programmierung von NC-Mehrschlittendrehmaschinen," wt-Produktion und Management, vol. 84, 1994, pp. 26-30.

Eckhard Hohwieler et al., "Bausteinkonzept fur die Programmierung von Fertigungsaufgaben," ZWF, vol. 91, No. 6, 1996, pp. 254-257.

Ireneusz Suwalski et al., "Softwarekonzepte fur eine steuerungsintegrierte Werkzeuguberwachung," ZWF, vol. 92, No. 9, 1997, pp. 436-439.

Georg Suss, "Framework—Basis eines Automatisierungssystems," etz Heft, vol. 21, 1998, pp. 22, 24 and 25.

* cited by examiner

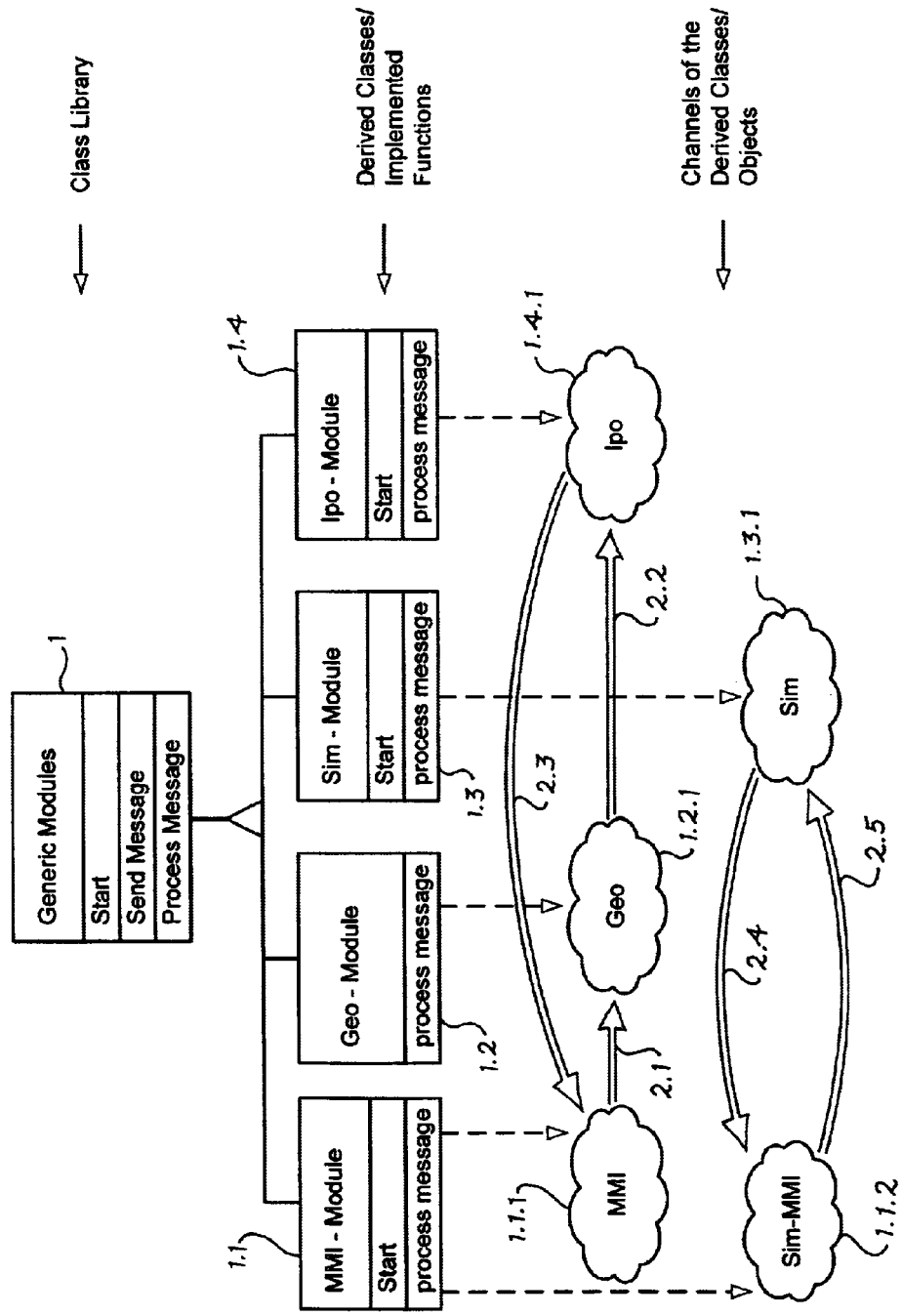

CONTROL SYSTEM OF A NUMERICAL TOOL MACHINE WITH A REUSABLE SOFTWARE STRUCTURE

Applicants claim, under 35 U.S.C. §§ 120 and 365, the benefit of priority of the filing date of Oct. 12, 2000 of a Patent Cooperation Treaty patent application, copy attached, Serial Number PCT/EP00/10042, filed on the aforementioned date, the entire contents of which are incorporated herein by reference, wherein Patent Cooperation Treaty patent application Serial Number PCT/EP00/10042 was not published under PCT Article 21(2) in English.

Applicants claim, under 35 U.S.C. § 119, the benefit of priority of the filing date of Oct. 14, 1999 of a German patent application, copy attached, Serial Number 199 49 558.0, filed on the aforementioned date, the entire contents of which are incorporated herein by reference.

BACKGROUND OF THE INVENTION

1. Field of the Invention

The present invention relates to a control system of a numeric machine tool with a reusable software structure.

2. Description of the Related Art

EP 0 524 344 B1 discloses a configurable machine tool control that includes several task-oriented units, for example a numerical control and a programmable logic controller, an operating unit and a communications area with a network interface. Moreover, at least one functional object, which is realized in software, or in software and hardware and which can perform a function, is provided. This functional object is subdivided into a procedure portion, a communications portion and possibly an operating portion. In addition, at least one object manager is provided, which manages at least two functional objects, in particular synchronizes their information exchange. This control structure is realized on at least one data processing installation, which processes the data from the functional objects and the object manager, and which itself is designed as a task-oriented unit. The functional objects are combined into processes. In this case as many processes are formed as data processing installations are provided, and one process is serviced by each data processing installation.

It is not known from EP 0 524 344 B1 to design the control system in such a way that its principal software structure can be used again.

An object-oriented control for machine tools is known from EP 0 657 043 B1, wherein a sequence of objects is formed from object classes. Based on the control disclosed in EP 0 524 344 B1, object classes and objects are disclosed in EP 0 657 043 B1, which are required for the realization of a conventional functionality of a control. Parts of this are, for example, object classes for types of processing, geometry, kinematics and technology data, as well as control data types and an object class called process control. Any arbitrary number of objects can be created from each object class, each of which respectively contains its own data range, a messenger mechanism for communication with other objects, and a procedure portion for executing methods of processing, geometry, kinematics and technology. Because of the derivation of several objects from one object class, these objects partially have an identical, or at least similar, program code which they have inherited from the object class. Furthermore, the object classes are also mapped as abstract data models in the internal control data storage, because of which abstract application-specific data types can be complemented, and application-specific object distinctions can be modified. The user input is interpreted by the process control and leads to the activation of the selected objects. The selected objects communicate with each other and, by this network-like linkage, constitute a functional unit of the control which is capable of running.

Although it is already known from EP 0 657 043 B1 to pass on properties of an object class to an object of this class, and to store abstract data models for the object classes, which can be changed by the programmer, this only relates to the objects. Since one object always implements at least one specific function of the control, and therefore of the machine, the objects need to have machine-specific characteristics, which makes them incompatible for controlling another machine. Therefore it is not possible as a rule to reuse objects without changing them.

A CNC control system is known from EP 0 717 866 B1, which contains an object-oriented program, in which objects exchange object-oriented information. The objects are divided into classes in the object-oriented program, for example a process class containing work processes such as drilling, gear-cutting, broaching, etc., which are executed by machine components. In this case one class always contains similar objects, i.e. objects which agree in their basic structure. Because of the uniform basic structure of the objects of a class, there is the possibility that selected properties of the respective class are inherited by the new object in the course of producing new objects. A further object class includes machine components, for example a spindle, shafts, a turntable, etc. Furthermore, object classes are provided for the kernel, with a motion and a logic controller as objects, for platform services, for the operating system and the device driver. When operating the control it is necessary for messages to be exchanged between the individual objects. For example, for a drilling operation a message regarding the number of revolutions of the drill is transmitted by the drill object to the spindle object, furthermore messages regarding the position of the hole are transmitted to the objects of the axes involved, etc. In this case a standard interface for the messages is provided, so that it has a universal structure and can be designed independently of the objects involved. With an object which receives or transmits messages regarding the movement, this standard interface for message exchange is realized by a software kernel, which is intended to be operated in real time and receives and transmits messages.

It is also not disclosed in EP 0 717 866 B1, how the structure of the control software is to be designed in order to make possible a reuse of the software design in connection with a similar numerical control.

The term framework is known from the book "Entwurfmuster" [Design Model] by Erich Gamma and Richard Helm, published in 1996 by Addison-Wesley, and the book "Objektorientierte Software—Entwicklung am Beispiel von ET++" [Object-Oriented Software Development in Accordance with the Example of ET++] by Erich Gamma, published in 1992 by Springer. A number of cooperating classes is understood as a framework, which represent the elements of a reusable design for a specific type of software. A framework offers an architectural aid when dividing the design into abstract classes and when defining their competences and interactions. A designer adapts the framework to a specific application by forming subclasses of the framework classes and putting their objects together. Therefore a framework is used by a programmer for fixing the software architecture of a group of related applications. The reuse of a design complements the reuse of the code already known from the object-oriented software design.

It is known from the article entitled "Framework—Basis eines Automatisierungssystems" [Framework—A Basis for an Automation System] by Georg Süss, published in etz, vol. 21/1998, pp. 22 to 25, that a framework not only makes possible a mutually used data storage, but also permits the realization of an integrated approach for the description and matched execution of a total application in a distributed architecture. For this purpose, for automated applications a framework must be based on Windows NT, in order to make possible the structuring of the total application into objects by the component object model and the distribution of the components of a system via several computers by the distributed component object model. In that case an automation framework offers the possibility of collecting the individual components of a distributed automation solution centrally in a system-wide data storage. Therefore this information is immediately available to each computer in an identical way. Moreover—in case of a subdivision of the application into individual objects—the framework provides the management of these objects and their assignment to individual network stations. This makes possible the dynamic displacement of individual objects at runtime, by which an improved utilization of the computers can be achieved. Moreover, further stations can be dynamically integrated into the application network for the running time by this.

It is known from the article entitled "Softwarekonzepte für eine steuerungsintegrierte Werkzeugüberwachung" [Software Concepts for Control-Integrated Tool Monitoring] by I. Suwalski, R. Urban and J. Burger, published in ZWF 92 (1997) 9, pp. 436 to 439, that the software frameworks have been developed from the area of object-oriented software technologies. A framework includes a number of cooperating classes, which determine the architecture of the application. Therefore, by using a framework, the reuse of a design is stressed over the reuse of a code. Problem-specific algorithms are decoupled from the design by using frameworks. The abstraction of the design of the system from the implementation of problem-specific algorithms achieved by this makes a faster development possible, leads to similar structures and simpler maintenance. Furthermore clear, structured and lean documentation is also made possible. This is explained by the example with frameworks which have predetermined the basic mechanisms of communication and the structure of the implementation as a state model for individual processes. Flexibility is achieved by behavior models, whose algorithmic characteristics are implemented for the respective application.

SUMMARY AND OBJECTS OF THE INVENTION

It is therefore an object of the present invention to design a control system in such a way, that the structure and the portion of the implementation of the control software which is independent of the machine and control, can be adopted for the greatest possible number of control functions.

This object is attained by a control system of a numerically controlled machine tool with a software structure, the control system including a program code of a control program specific to a machine tool and a framework that is independent of an application, wherein the framework is implemented in the form of a class library that has a first set of classes that define a functional structure of the control system. A second set of classes derived from the first set of classes of the framework, wherein the second set of classes contain the program code that is specific to the machine tool and that implements application specific functions of at least one of several functional groups associated with a man-machine interface, geometry processing, an interpolator, movement processing and a programmable logic controller.

The control system in accordance with the present invention has the advantage that the software designed as a framework is implemented as a class library for a generic numerical control, which completely contains the software structure of a generic numerical control. In this case, the software structure of a generic numerical control includes the entire functional structure of the control software, but not the specifically programmed functions. Uniform interfaces for the specific functions are defined by the class library. The individual functions performed by the control are implemented by a control-specific class, which has been derived from a class in the class library. Because of this, this control structure can be transferred to different controls, even if the specific functions of other controls are completely different. The software structure becomes reusable by abstracting the structure and the class libraries (program with an executable code) from the specific functions.

The present invention will be explained in greater detail in what follows by the embodiment represented in the drawing.

BRIEF DESCRIPTION OF THE DRAWING

FIG. 1 schematically shows an embodiment of a control program according to the present invention, the control program being segmented into instantiations of derived classes.

The drawing FIGURE shows a possible division of the control program into classes, derived classes and instantiations of derived classes.

DESCRIPTION OF THE PREFERRED EMBODIMENT(S) OF THE INVENTION

The present invention will be explained in what follows by a simple numerical control for a machine tool. Thereby it is unimportant for the structure of the control software whether the machine tool is a milling cutter, a lathe, a grinder or eroding machine, or a processing center.

The control program for a numerical control, shown partially in a graphic form in FIG. 1, has been realized on the basis of a framework, wherein the framework is implemented by at least one class library 1. The essential functions of the control program of a machine tool can be subdivided into functional groups called geometry processing 1.2, interpolator 1.4, man-machine interface 1.1, movement control and a programmable logic controller.

In accordance with the present invention, a framework class library 1 is provided. The class library 1 contains the software of a generic control for the individual abstracted functionalities and their interaction. In this case only the functional structure of the control program is determined by the class library 1; but the program code for the specific functions is not contained in the framework. This program code is defined by the specific implementation of the classes in the form of derived classes 1.1 to 1.4, wherein the essential characteristic is not the structure, but the performed function and the program code required for that. Therefore the existence of a function in the control program, and the interaction with other functions of the control program, is defined by the framework. But the implementation of the function by the program code is not contained in the framework. This takes place in a derived class 1.1 to 1.4, which is derived from a class of the class library and is integrated into the framework.

An application is realized by the implementation of the derived classes. For example, a derived class for an interpolator 1.4 is implemented, which is matched to a definite form of triggering the drive mechanisms.

Furthermore, the interaction, i.e. the cooperation, between individual derived classes 1.1 to 1.4 is realized by the framework as a functionality of the generic control. This takes place via communications channels 2.1 to 2.5 between individual objects 1.1.1 to 1.4.1, which are instantiations of the derived classes 1.1 to 1.4 of the framework, or the class library 1. Such a communications channel 2.1 to 2.5 is implemented by mechanisms for data exchange known in the prior art. A determination is made by a communications channel 2.1 to 2.5, which objects 1.1.1 to 1.4.1 of the framework can communicate with each other at all. Methods are already known in the prior art for defining which objects, as instantiations of derived classes 1.1.1 to 1.4.1, communicate with each other. There, this definition is a part of the implementation of a specific control software.

The data format and the protocol of the transmission data is furthermore defined by the framework, i.e. which data are transmitted through a communications channel 2.1 to 2.5 between objects 1.1.1 to 1.4.1 of the framework. The interpretation of the transmitted data as parameters or commands is performed by the derived classes 1.1 to 1.4.

If an already existing framework is used for producing a new control program, the programmer already has framework classes 1 available which, for producing the control program for a specific control of a specific machine tool, must be partially adapted to the latter, or implemented for it. This occurs in that the programmer forms derived classes 1.1 to 1.4 from the existing framework classes 1, and in this way creates an application.

The classes 1 of the framework define virtual functions, whose implementation takes place in the derived classes 1.1 to 1.4, or whose implementation can also be changed (overwritten) by the derived classes 1.1 to 1.4, if needed. The implementation of the derived class 1.1 to 1.4 takes place in that the programmer programs the implementations of this virtual function needed for the desired functionality and defines the data (attributes) necessary for this.

In a second step of the implementation the programmer establishes from which derived classes 1.1 to 1.4 objects 1.1.1 to 1.4.1 are generated, and which objects 1.1.1 to 1.4.1 communicate with each other. In this case the information as to which objects 1.1.1 to 1.4.1 are created and which communicate with each other, can exist in the derived classes, or can be read out of an external data file or input by the user.

The basic mode of functioning is defined by the generic control and implemented in the classes 1 of the framework. The specific functions of a control result from calling up virtual functions of the generic control during operations, and the result depending from the definite implementation is used again and, if required, transmitted to objects 1.1.1 to 1.4.1, whose selection also is a function of the specific implementation, as described above.

By the use of an already existing framework, the creation of a control program is then limited to the programming of the technology- and machine-specific functions to be performed in derived classes 1.1 to 1.4, and the definition of the interaction between objects 1.1.1 to 1.4.1 via communications channels 2.1 to 2.5.

Correspondingly, in the operation of a numerical control programmed in this way, action is taken as represented in the drawing figure. The generic control defined by the class library 1 of the framework has, for example, inter alia the following functions:

Start of the control

Transmitting a message from a transmitter to a receiver and

Triggering the message processing at the receiver.

After a user has switched on the control, the objects 1.1.1 to 1.4.1 needed for the application are created by the mechanism existing in the framework for generating derived classes 1.1 to 1.4. Furthermore, the start function is called up in the class library 1 of the framework which, because of the functionality of the generic control, causes the call-up of a start function in each created object 1.1.1 to 1.4.1. In this case it is possible to transfer a specific implementation to the start function of a derived class 1.1 to 1.4.

For example, in the derived class 1.1, man-machine interface, a window is opened by the start function, in which the user can make an input. This input is awaited, a message is formed from this input and this message is transmitted.

The positions of the machine shafts are maintained in the derived class 1.4, interpolator, by the start function. For this purpose, the actual position values of the shafts of the machine are determined and these actual values are entered into the control circuit as setpoint values of the position.

A window for representing a simulated graphic illustration is opened by the start function in the derived class 1.3, simulation.

The start function does not implement the derived class 1.2 of geometry processing (geo) and instead uses the implementation existing in the class library.

As already explained, a message is sent by the man-machine interface 1.1.1 as soon as an input is finished. This message is transmitted by the framework via a communications channel 2.1 to the correct receiver, and processing of the message is triggered in the receiver by the framework.

In the course of the processing triggered in the respective objects 1.1.1 to 1.4.1 following receipt of the message, a function defined in the class library 1 of the framework is applied to the data transmitted in the message. This function must be implemented in each derived class 1.1 to 1.4. The framework does not make an implementation available for this.

In the geometry object 1.2.1, the data from a received message are interpreted as positions to be approached, on the basis of which parameters of the path curve are calculated and are transmitted as a message.

These parameters of the path curve are passed on via a communications channel 2.2 to the interpolator object 1.4.1, by which the shaft drives of the machine are controlled, and which transmits the approached path points in the form of a message.

If message processing is triggered in the object 1.1.1 of the man-machine interface by the receipt of a new message, the received data are interpreted as a position, which is displayed to the user.

If processing is only to be simulated, an object 1.1.2 is generated for the simulation by the derived class 1.1, man-machine interface, which passes on the input data as a message to the simulation object 1.3.1.

During the simulation of processing, the simulation object 1.3.1 conducts the appropriate calculations in accordance with the input and transmits the approached path points in the form of a message.

This message is transmitted by the framework to the man-machine interface 1.1.2 for the simulation. Based on the message processing triggered there, the simulation data are displayed to the user.

A function from the class library 1 of the framework is called up for realizing the transmission of a message. Since the conveyance of messages is a function of the generic control, there is no necessity, and also no possibility, of overwriting this function by a specific implementation.

In accordance with the drawing figure, the control software can be subdivided. The class library 1 contains functions which are not specifically designed for a control or a machine, for example the sending of a message.

Moreover, virtual functions are a part of the class library 1 which, based on the specific control hardware or machine mechanism, can be given a specific design by the programmer of a derived class 1.1 to 1.4, such as the start function, for example, or must be given a specific design, such as the processing of a message, for example, so that they interact with the specific control hardware and/or machine mechanism.

The objects 1.1.1 to 1.4.1 are instantiations of the derived classes 1.1 to 1.4 and contain the specific data for a specific function.

For example, the virtual function of the man-machine interface 1.1 was initially implemented for interacting with specific control hardware in order to realize an input and output by specific hardware. Thereafter, the objects required for a man-machine interface for the simulation 1.2.1, and one for processing 1.1.1, are created.

In order to achieve the required interaction via the communications channels 2.1 to 2.5, it must be known to the framework which of these objects 1.1.1 to 1.4.1 exchange messages with each other. For example, an object 1.1.1 for input sends messages to the object 1.2.1 for the geometry calculation, and receives messages from the object 1.4.1 for interpolation, while the instantiation 1.1.2 of the same class for simulation exchanges messages with the object 1.3.1 for simulation calculations.

The division into classes 1, derived classes 1.1 to 1.4 and objects 1.1.1 to 1.4.1 made here represents only one of several options. Alternatively it would be conceivable, for example, that geometry processing and/or the interpolator are programmed independently of the hardware, so that these functionalities can be realized in a class 1.

By the division of the program code into one arranged in the framework, and a machine-specific program code outside of the framework described here, a differentiation is made for the functions of control between a reusable structure, which is combined into a framework, and a machine-specific program code, which is implemented outside of the framework. The program code of the framework can be used in a group of implementations which differ in the control hardware used and in the machine mechanisms. In this case the degree of how far the differences may go is a function of the degree of abstraction of the framework.

Program codes of the derived classes 1.1 to 1.4 can only be transferred to other applications if compatibility is assured for at least the control hardware and the machine mechanisms.

It is advantageous to implement the generally applicable functionality of the control program for numerical control in the form of a framework in such a way as to be able to reuse the interaction of the classes 1 and the derived classes 1.1 to 1.4 defined by the framework. Because of this, the complex linkages of the individual functions among each other through the communications channels 2.1 to 2.5 can be reused.

The framework can additionally contain a mechanism for error treatment. A class with generic functions for error treatment is provided for this in the framework, from which the derived class for error treatment is created by a machine-specific implementation of the functions. At least one object is created by the generation of the functions of the derived class.

Since an error can occur with any arbitrary application of a function to data constituting an object, a communications channel from each object to the object for error treatment is advantageously provided. Depending on the functions existing for error treatment, communications channels from the object for error treatment to the objects required for error treatment must also be correspondingly provided.

If, for example, with any arbitrary error it is intended by a function for error treatment to prevent any movement of the machine controlled by the control program, communications channels from all objects 1.1.1 to 1.4.1 to the object for error treatment must be provided. By this it is made possible that errors which can occur in any object can actually be detected. Furthermore, a communications channel from the object for error treatment must exist to the object 1.4.1, interpolator, through which the movement control takes place in order to prevent any movement in case of an error.

Alternatively to stopping all axes of the machine it is also possible to provide that a defined retraction path is traveled in case of an error, for example for removing the tool of a milling cutter from the workpiece, so that no damage is caused to the tool or to the workpiece by the error. In that case a retraction movement is triggered in the interpolator by the message of the object for error treatment to the interpolator object 1.4.1, that an error has occurred.

When implementing a control which executes the control program in accordance with the present invention, there is the option to design the control as a divided system, in which portions of the control, and therefore the control program, are executed at different locations by different processors. In this case it is sensible to divide the control program into processes, wherein at least one process is assigned to each processor for execution. A mechanism for interaction across process borders is provided in the framework in this case. It is possible by this mechanism that messages can be exchanged between objects of different processes. Thus, the process borders do not represent a barrier to the message exchange.

For example, for error analysis or for maintenance or repair jobs, portions of the control program can then run in a first process at the control provider and can exchange messages by means of a portion of the control program at the user, which is executed as the second process of the control program, over a general data net, for example the internet.

With divided systems, the mechanism for synchronization of the execution of the control program with incoming messages in particular, which is contained in the framework, is of importance, wherein the sequence of the processing of incoming messages from independent communications channels is controlled. By this it is assured that the messages, whose data are just then required by a function, are processed, or that—to the extent that no more urgent messages exist—the functions are executed, for which data are just then transmitted by a message. Furthermore, it is assured in this way by the framework that all messages are processed.

The framework in the form of a class library 1, and the application-specific functions in the derived classes 1.1 to 1.4 have been realized in accordance with the rules of object-oriented programming.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

What is claimed is:

1. A control system of a numerically controlled machine tool with a software structure, the control system comprising:
    a program code of a control program specific to a machine tool; and a framework that is independent of an application, wherein said framework is implemented in the form of a class library that comprises a first set of classes that define a functional structure of said control system and wherein said framework comprises a mechanism for error treatment that comprises:
        a class with generic functions for error treatment provided in said framework; and
        a class with a machine-specific implementation of said generic functions derived from said class with generic functions; and
    a second set of classes derived from said first set of classes of said framework, wherein said second set of classes contain said program code that is specific to said machine tool and that implements application specific functions of at least one of several functional groups associated with a man-machine interface, geometry processing, an interpolator, movement processing and a programmable logic controller.

2. The control system in accordance with claim 1, wherein said framework comprises a mechanism that forms objects as instantiations of said second set of classes.

3. The control system in accordance with claim 2, wherein said framework comprises a mechanism for interaction between said objects.

4. The control system in accordance with claim 3, wherein said mechanism for interaction between said objects includes transmission of messages over communications channels and causing processing of said transmitted messages at a receiver, wherein a data format and protocol of said transmitted messages are defined in an object-independent manner.

5. The control system in accordance with claim 2, further comprising several processes which are independent of each other, and wherein said framework comprises a mechanism that causes interaction between said objects across process borders.

6. The control system in accordance with claim 1, wherein said framework comprises a mechanism for synchronizing execution of said control program with incoming messages, and said framework controls a sequence of processing of said incoming messages from independent communications channels.

* * * * *